United States Patent
Rubel (10) Patent No.: US 7,271,712 B2
(45) Date of Patent: Sep. 18, 2007

(54) VEHICLE SEATBELT USAGE SENSING APPARATUS AND METHOD FOR GENERATING AND TRANSMITTING A SEATBELT WARNING SIGNAL

(75) Inventor: Aaron Paul Rubel, New Baltimore, MI (US)

(73) Assignee: Faurecia Automotive Seating Canada Limited, Mississauga, On (CA)

( * ) Notice: Subject to any disclaimer, the term of this patent is extended or adjusted under 35 U.S.C. 154(b) by 204 days.

(21) Appl. No.: 11/033,817

(22) Filed: Jan. 13, 2005

(65) Prior Publication Data

US 2005/0156726 A1 Jul. 21, 2005

Related U.S. Application Data

(60) Provisional application No. 60/537,029, filed on Jan. 20, 2004.

(51) Int. Cl.
- *B60Q 1/00* (2006.01)
- *G08B 21/00* (2006.01)
- *B60K 28/00* (2006.01)

(52) U.S. Cl. .................. 340/457.1; 340/667; 340/666; 340/522; 307/10.1; 180/286; 180/268; 180/273; 701/45

(58) Field of Classification Search ............. 340/457.1, 340/667
See application file for complete search history.

(56) References Cited

U.S. PATENT DOCUMENTS 3,720,911 A 3/1973 Bomar, Jr.

(Continued)

FOREIGN PATENT DOCUMENTS

DE 198 25 910 A1 12/1999

(Continued)

OTHER PUBLICATIONS

Delphi Passive Occupant Detection System Gen II [online], Delco Electronics Systems, Kokomo, Indiana, US, Dec. 4, 2003 [retrieved on May 17, 2005]. Retrieved from the Internet<URL: http://web.archive.org/web/*/http://www.delphi.com/pdf/d/rec_pods.pdf.

(Continued)

*Primary Examiner*—Donnie L. Crosland
(74) *Attorney, Agent, or Firm*—Patrick J. Hofbauer; Kevin E. Holbeche (57) ABSTRACT

A seatbelt usage sensing apparatus for use with a vehicle which includes a seat assembly, an occupant sensor, a seatbelt sensor, and a warning signal generator. The seat assembly includes a seat cushion that is adapted to be occupied by a seat occupant in an occupied configuration. The seat assembly also includes a seatbelt assembly which has a seatbelt webbing and a seatbelt fastening member. The seatbelt assembly is moveable between fastened and unfastened configurations. In the unfastened configuration, the seatbelt fastening member is removed from secure engagement with the seatbelt webbing. The warning signal generator can generate and transmit a seatbelt warning signal when the occupant sensor determines that the seat cushion is in the occupied configuration and the seatbelt sensor determines that the seatbelt assembly is in the unfastened configuration. The seatbelt warning signal is transmitted substantially exterior relative to an interior seating compartment of the vehicle.

33 Claims, 6 Drawing Sheets

U.S. PATENT DOCUMENTS

| | | | |
|---|---|---|---|
| 3,875,556 A | | 4/1975 | Beaird |
| 4,667,336 A | | 5/1987 | Best |
| 4,849,733 A | | 7/1989 | Conigliaro et al. |
| 5,714,930 A | * | 2/1998 | McKinney, Jr. ............. 340/468 |
| 6,059,066 A | | 5/2000 | Lary |
| 6,215,395 B1 | | 4/2001 | Slaughter et al. |
| 6,704,674 B2 | | 3/2004 | Kim et al. |
| 6,784,803 B1 | | 8/2004 | Hypke et al. |
| 6,937,143 B2 | * | 8/2005 | Ohtaka ....................... 340/438 |
| 2003/0160689 A1 | * | 8/2003 | Yazdgerdi ................ 340/457.1 |
| 2003/0164445 A1 | | 9/2003 | Turnbull |
| 2003/0226409 A1 | | 12/2003 | Steele et al. |
| 2005/0061568 A1 | * | 3/2005 | Schondorf et al. .......... 180/268 |

FOREIGN PATENT DOCUMENTS

WO     WO 03/104032     12/2003

OTHER PUBLICATIONS

Sensing and Diagnostic Module S D M—D [online], Delco Electronics Systems, Kokomo Indiana, US, Dec. 10, 2003 [retrieved on May 17, 2005]. Retrieved from the Internet<URL: http://web.archive.org/web/*/http://www.delphi.com/pdf/d/sir_sdm-d.pdf.

Martin, Norman, Big Brother Is Watching! [online] Oct. 1999 [retrieved on May 16, 2005]. Retrieved from the Internet<URL: http://www.findarticles.com/p/articles/mi_m3012/is_10_179/ai_57513432/print.

* cited by examiner

VEHICLE SEATBELT USAGE SENSING APPARATUS AND METHOD FOR GENERATING AND TRANSMITTING A SEATBELT WARNING SIGNAL

FIELD OF THE INVENTION

The present invention relates generally to the field of sensing seatbelt usage in vehicles and more particularly to a vehicle seatbelt usage sensing apparatus and method for generating and transmitting a seatbelt warning signal.

BACKGROUND OF THE INVENTION

Various vehicle manufacturers and safety organizations have performed studies of seatbelt usage in vehicles, and these studies have confirmed that vehicle occupants wearing seatbelts are generally safer and better protected in the event of a crash than those who do not wear seatbelts. As a result, a number of public awareness campaigns have been launched to encourage the use of seatbelts in vehicles, and most jurisdictions have actually enacted seatbelt laws to mandate such use. Even still, in vehicle crash situations, a significant number of preventable fatalities and serious injuries occur each year as a result of the failure of vehicle occupants to properly wear their seatbelts.

Current vehicle safety systems only provide a light and/or sound indicator within the interior seating compartment of the vehicle, with this indicator serving only to notify the occupants as to whether the seatbelts are buckled. Current designs of vehicle safety systems do not provide seatbelt warning signals that may be readily perceived by those situated substantially exterior relative to the interior seating compartment of the vehicle. As such, law enforcement officials and the like are faced with the often difficult and error-prone task of performing quick visual checks of seatbelt shoulder harnesses to ascertain whether each occupant in each passing vehicle is properly buckled in.

It should also be noted that a number of current vehicles are provided with event data recorders that record a variety of data following a vehicle crash event—such data including whether a driver seatbelt and/or a front passenger seatbelt was buckled at the time of the vehicle crash event. Current event data recorders, however, do not provide a permanent record of seatbelt usage—in vehicle crash events and otherwise—that is capable of identifying each and every time a particular seat assembly was occupied and whether the associated seatbelt assembly was then unfastened, improperly fastened, and/or properly fastened.

That is, none of the current designs of vehicle safety systems and event data recorders provide an integrated and readily ascertainable seatbelt warning signal substantially exterior of the interior seating compartment of the vehicle in conditions where a seat assembly is occupied but the associated seatbelt assembly is either in an unfastened or improperly fastened configuration. Conversely, none of the current designs of vehicle safety systems and event data recorders provide an integrated and readily ascertainable seatbelt approved signal substantially exterior of the interior seating compartment of the vehicle in conditions where a seat assembly is occupied and the associated seatbelt assembly is in a properly fastened configuration.

In order to increase occupant use and wearing of seatbelts, what is needed is an integrated seatbelt usage sensing apparatus that generates and transmits a readily ascertainable seatbelt warning signal substantially exterior of the interior seating compartment of the vehicle in conditions where the seat assembly is occupied but the associated seatbelt assembly is either in an unfastened or improperly fastened configuration. The seatbelt warning signal would ideally be a readily observable exterior light and/or frequency indicator. Such a system should also provide a permanent data log of seat belt usage by the occupants of the vehicle.

It is, therefore, one object of the present invention to provide a seatbelt usage sensing apparatus that generates and transmits a seatbelt warning signal substantially exterior of the interior seating compartment of the vehicle when a seat assembly is occupied and an associated seatbelt assembly is in an unfastened configuration.

It is another object of the present invention to provide a seatbelt usage sensing apparatus that generates and transmits a seatbelt warning signal substantially exterior of the interior seating compartment of the vehicle when a seat assembly is occupied and an associated seatbelt assembly is in an improperly fastened configuration.

It is a further object of the present invention to generate and transmit a seatbelt warning signal that may be readily observed and ascertained substantially exterior to an interior seating compartment of the vehicle.

It is a further object of the present invention to generate and transmit the seatbelt warning signal only when the seat assembly is occupied by a body or seat occupant having a weight in excess of a predetermined threshold value.

It is another object of the present invention to provide a seatbelt usage sensing apparatus that possesses means to reduce potential circumvention by vehicle occupants in generating and transmitting the seatbelt warning signal.

It is a further object of the present invention to provide a seatbelt usage sensing apparatus that possesses occupant responsive means to reduce potential circumvention by vehicle occupants in generating and transmitting the seatbelt warning signal.

It is a still further object of the present invention to provide a seatbelt usage sensing apparatus that enables permanent recording of seatbelt usage information.

It is yet still another object of the present invention to provide a seatbelt usage sensing apparatus that enables permanent recording of seat identification and time and date signature data for each seatbelt warning signal.

It is a yet still further object of the present invention to provide a seatbelt usage sensing apparatus that enables remote recording of seatbelt usage information.

It is another object of the present invention to provide a seatbelt usage sensing apparatus that enables remote identification of the vehicle transmitting each seatbelt warning signal.

It is a further object of the present invention to provide a seatbelt usage sensing apparatus that generates and transmits a seatbelt approved signal substantially exterior of the interior seating compartment of the vehicle when the seat assembly is occupied and the associated seatbelt assembly is in a properly fastened configuration.

SUMMARY OF THE INVENTION

In accordance with the present invention there is disclosed a seatbelt usage sensing apparatus for use with a vehicle. The seatbelt usage sensing apparatus comprises a seat assembly having a seat cushion portion and a seatbelt assembly. The seat cushion portion is adapted to be occupied by a body or seat occupant in an occupied configuration. The seatbelt assembly has a seatbelt webbing and a seatbelt fastening member. The seatbelt assembly is selectively moveable between a fastened configuration and an unfastened configuration. In the fastened configuration, the seatbelt fastening member securely engages the seatbelt webbing, and in the unfastened configuration, the seatbelt fastening member is removed from secure engagement with the seatbelt webbing. The seatbelt usage sensing apparatus further comprises an occupant sensing means for determining when the seat cushion portion is in the occupied configuration, and a seatbelt sensing means for determining when the seatbelt assembly is in the unfastened configuration. According to the invention, the seatbelt usage sensing apparatus still further comprises a warning signal generator adapted to generate and transmit a seatbelt warning signal when the seat cushion portion is in the occupied configuration and the seatbelt assembly is in the unfastened configuration. The seatbelt warning signal is transmitted substantially exterior relative to an interior seating compartment of the vehicle.

In accordance with one aspect of the apparatus, the seatbelt warning signal comprises an electromagnetic frequency signal, and the warning signal generator comprises an electromagnetic frequency generator adapted to emit the electromagnetic frequency signal.

In accordance with a further aspect of the apparatus, the electromagnetic frequency generator is securely mounted substantially adjacent to an exterior surface of the vehicle. The electromagnetic frequency signal is selected from the group consisting of infrared signals, visible light signals, and ultraviolet signals.

In accordance with a still further aspect of the apparatus, the electromagnetic frequency signal is a visible light signal, and the electromagnetic frequency generator comprises an illumination device adapted to emit the visible light signal.

In accordance with a yet further aspect of the apparatus, the illumination device comprises an exterior fascia having a translucent portion, with the translucent portion depicting a seatbelt warning indicia.

In accordance with an additional aspect of the apparatus, the illumination device is mounted substantially adjacent to a high-mounted stop light device of the vehicle.

In accordance with a different aspect of the apparatus, the electromagnetic frequency signal comprises a radio frequency signal, and the electromagnetic frequency generator comprises an antenna device adapted to emit the radio frequency signal.

In accordance with a further aspect of the apparatus, the antenna device is securely mounted substantially adjacent to an exterior surface of the vehicle.

In accordance with another aspect of the apparatus, the seatbelt warning signal comprises a sound wave signal. The sound wave signal is selected from the group consisting of infrasound signals, audible sound signals, and ultrasound signals. The warning signal generator comprises a speaker device adapted to emit the sound wave signal.

In accordance with a different aspect of the apparatus, the seatbelt warning signal comprises a unique vehicle identification signal that is adapted to enable remote identification of the vehicle transmitting the seatbelt warning signal.

In accordance with another aspect of the apparatus, the seatbelt warning signal comprises a unique seat identification signal that is adapted to enable external identification of the seat assembly transmitting the seatbelt warning signal.

In accordance with a different aspect of the apparatus, the occupant sensing means is adapted to sense when an at-rest occupying force exerted by the seat occupant upon the seat cushion portion is in excess of a predetermined threshold value. The warning signal generator is more particularly adapted to generate the seatbelt warning signal only when the occupying force is in excess of the predetermined threshold value.

In accordance with another aspect of the apparatus, the seatbelt sensing means is further adapted to determine when the seatbelt assembly is in the fastened configuration and to sense when a tensioning force exerted by the seat occupant upon the seatbelt webbing is below a predetermined tensioning threshold value. The warning signal generator is further adapted to generate the seatbelt warning signal when the seat cushion portion is in the occupied configuration, the seatbelt assembly is in the fastened configuration, and the tensioning force is below the predetermined tensioning threshold value.

In accordance with a further aspect of the apparatus, the occupant sensing means is adapted to gauge an at-rest occupying force exerted by the seat occupant upon the seat cushion portion. The predetermined tensioning threshold value is predetermined in dependent relation based upon the occupying force.

In accordance with a different aspect of the apparatus, the seatbelt assembly further comprises a tensioning means for extending and retracting the seatbelt webbing. The seatbelt sensing means is further adapted to determine when the seatbelt assembly is in the fastened configuration and to sense when the seatbelt webbing is extended below a predetermined extension threshold value. The warning signal generator is further adapted to generate the seatbelt warning signal when the seat cushion portion is in the occupied configuration, the seatbelt assembly is in the fastened configuration, and the seatbelt webbing is extended below the predetermined extension threshold value.

In accordance with a further aspect of the apparatus, the occupant sensing means is adapted to gauge an at-rest occupying force exerted by the seat occupant upon the seat cushion portion. The predetermined extension threshold value is predetermined in dependent relation based upon the occupying force.

In accordance with another aspect of the apparatus, the warning signal generator comprises an electronic signal generator adapted to generate and transmit the seatbelt warning signal. The warning signal generator further comprises a seatbelt usage recording device that is securely mounted substantially exterior relative to the interior seating compartment of the vehicle. The seatbelt usage recording device is adapted to receive and record the seatbelt warning signal.

In accordance with a further of the apparatus, the seatbelt usage recording device is further adapted to record time and date signature data for each seatbelt warning signal.

In accordance with a still further aspect of the apparatus, the seatbelt usage recording device is also adapted to record a unique seat identification datum for each seatbelt warning signal. The unique seat identification datum is adapted to identify the seat assembly transmitting the seatbelt warning signal.

In accordance with an alternate aspect of the invention, the warning signal generator may be adapted to generate and transmit the seatbelt warning signal when the seat cushion portion is in the occupied configuration and the seatbelt assembly is in the fastened configuration, with said seatbelt warning signal being transmitted substantially exterior relative to an interior seating compartment of the vehicle.

In accordance with the present invention, there is also disclosed a method for generating and transmitting a seatbelt warning signal from a seat assembly and a corresponding seatbelt assembly of a vehicle. The method comprises a first step of determining when the seat assembly is in an occupied configuration whereat a body or seat occupant occupies a seat cushion portion of the seat assembly in an interior compartment of the vehicle. The method comprises a second step of determining when the seatbelt assembly is in an unfastened configuration whereat a seatbelt fastening member of the seatbelt assembly is removed from secure engagement with a seatbelt webbing of the seatbelt assembly. The method comprises a third step of generating the seatbelt warning signal when the seat assembly is in the occupied configuration and the seatbelt assembly is in the unfastened configuration. The method comprises a fourth step of transmitting the seatbelt warning signal substantially exterior relative to the interior seating compartment.

In accordance with one aspect of the method, the seat assembly is only determined to be in the occupied configuration when an at-rest occupying force exerted by the seat occupant upon the seat cushion portion is in excess of a predetermined threshold value.

In accordance with a different aspect of the method, the method further comprises a first additional step of determining when the seatbelt assembly is in a fastened configuration whereat the seatbelt fastening member securely engages the seatbelt webbing. The method further comprises a second additional step of determining when a tensioning force exerted by the seat occupant upon the seatbelt webbing is below a predetermined tensioning threshold value. The method further comprises a third additional step of generating the seatbelt warning signal when the seat assembly is in the occupied configuration, the seatbelt assembly is in the fastened configuration, and the tensioning force is below the predetermined tensioning threshold value.

In accordance with a further aspect of the method, the method further comprises a fourth additional step, before the second additional step, of gauging an at-rest occupying force exerted by the seat occupant upon the seat cushion portion. Thereafter, but still before the second additional step, the predetermined tensioning threshold value is predetermined in dependent relation based upon the occupying force.

In accordance with another aspect of the method, the method further comprises a fifth additional step of determining when the seatbelt webbing is extended below a predetermined extension threshold value. Thereafter, the seatbelt warning signal is generated when the seat assembly is in the occupied configuration, the seatbelt assembly is in the fastened configuration, and the seatbelt webbing is extended below the predetermined extension threshold value.

In accordance with a further aspect of the method, the method further comprises a sixth additional step, before the fifth additional step, of predetermining the predetermined extension threshold value in dependent relation based upon the occupying force.

In accordance with another aspect of the method, the seatbelt warning signal is received and recorded in a seatbelt usage recording device that is substantially exterior relative to the interior seating compartment.

In accordance with a further aspect of the method, the seatbelt usage recording device is located remotely relative to the vehicle.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 3:
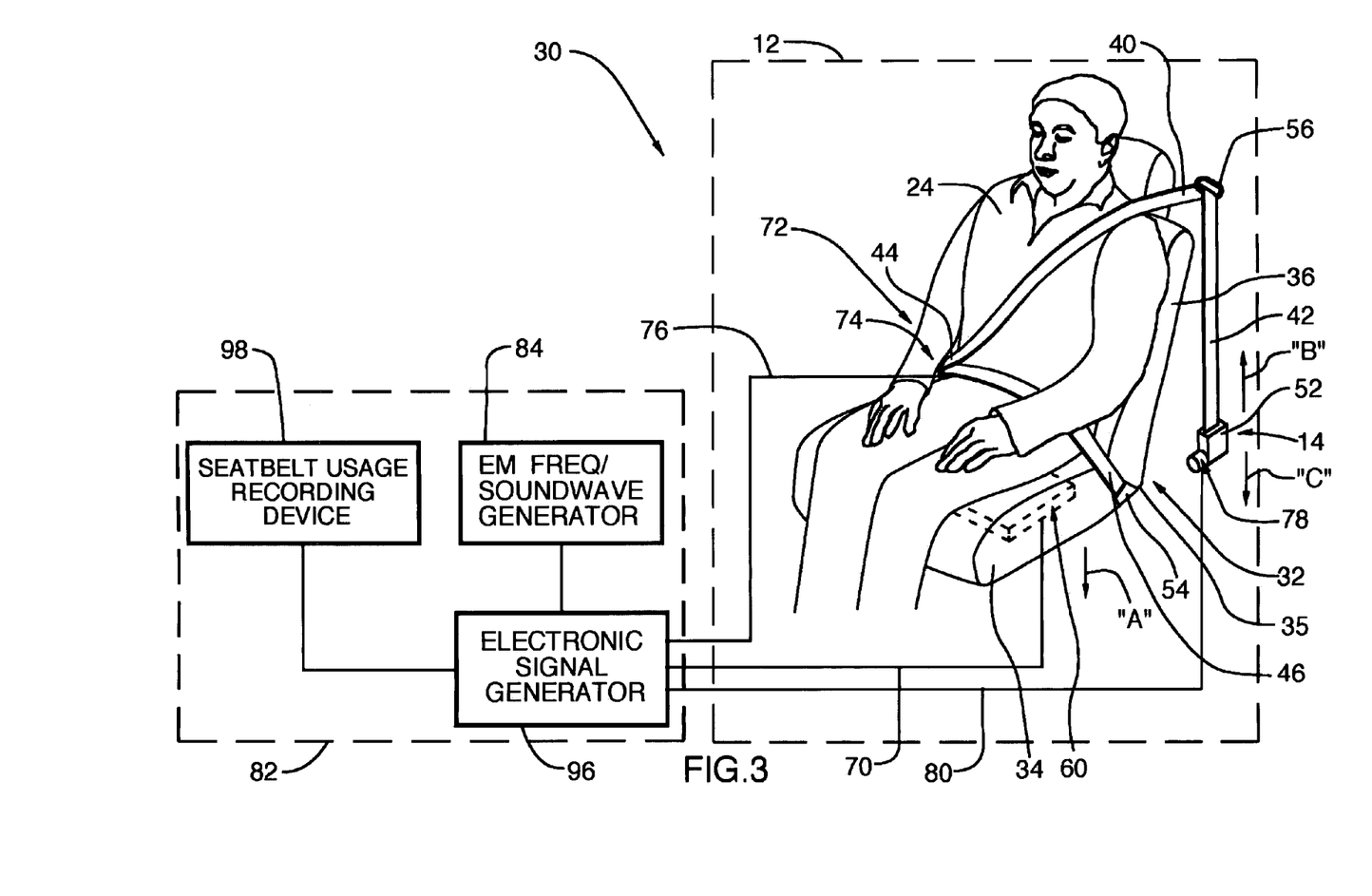
FIG. 3 is a top front left perspective view of a seatbelt usage sensing apparatus according to the present invention.
Figure 4:
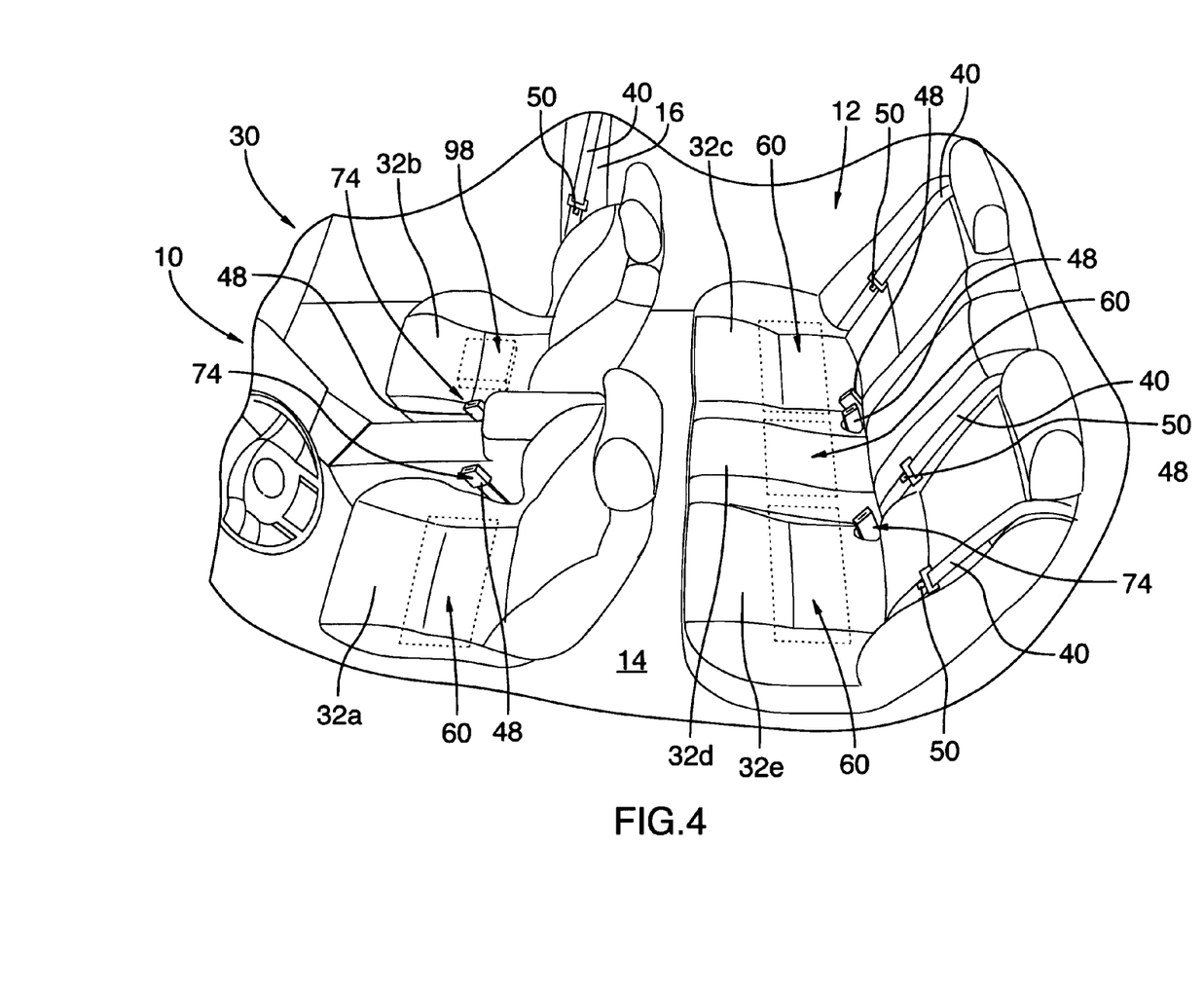
FIG. 4 is a top front left perspective view of an interior seating compartment of a vehicle shown with the seatbelt usage sensing apparatus of FIG. 3 in phantom outline.

Referring now to the figures, and as best seen in FIGS. 3 and 4, there is shown a seatbelt usage sensing apparatus 30 for use with a vehicle 10 having an interior seating compartment 12. The seatbelt usage sensing apparatus 30 includes a seat assembly 32 having a seat cushion portion 34 and a seatbelt assembly 38, an occupant sensing means 58 for determining when the seat cushion portion 34 is in an occupied configuration (best seen in FIG. 3), a seatbelt sensing means 72 for determining when the seatbelt assembly 38 is in an unfastened configuration (best seen in FIG. 7), and a warning signal generator 82.

The seat cushion portion 34 of the seat assembly 32 is adapted to be occupied by a body or seat occupant 24 in the occupied configuration (as best seen in FIG. 3). The seat assembly 32 is preferably of the type that includes a seatback portion 36. As best seen in FIG. 4, the interior seating compartment 12 of the vehicle 10 preferably provides a plurality of seat assemblies 32, including a driver seat assembly 32a, a front passenger seat assembly 32b, a rear right seat assembly 32c, a rear center seat assembly 32d, and a rear left seat assembly 32e. It should also be appreciated that the seatbelt usage sensing apparatus 30 of the present invention is equally adapted for use in vehicles with other seating arrangements, such as, for example, two and seven seat vehicles (not shown).

The seatbelt assembly 38 associated with each seat assembly 32 has a seatbelt webbing 40 and a buckle or seatbelt fastening member 48. As best seen in FIG. 3, an extending end portion 42 of the seatbelt webbing 40 is wound on a recoil and tensioning device 52 located near an interior floor 14 of the vehicle 10, adjacent to an outboard edge 35 of the seat assembly 32. As shown, an anchored end portion 46 of the seatbelt webbing 40 is also typically secured substantially adjacent to the outboard edge 35 of the seat assembly 32 by means of an anchor member 54. The anchor member 54 may alternately be affixed to the interior floor 14 or to another part of the vehicle 10 (not shown). An intermediate portion 44 of the seatbelt webbing 40 passes through a guide ring 56 that is positioned in vertically spaced relation from the interior floor 14. A tongue plate 50 is slidably carried by the intermediate portion 44 of the seatbelt webbing 40 that is between the guide ring 56 and the anchor member 54. Similarly, FIG. 4 depicts a rear row of seat assemblies 32, each having an all-belts-to-seat (ABTS) apparatus.

Figure 7:
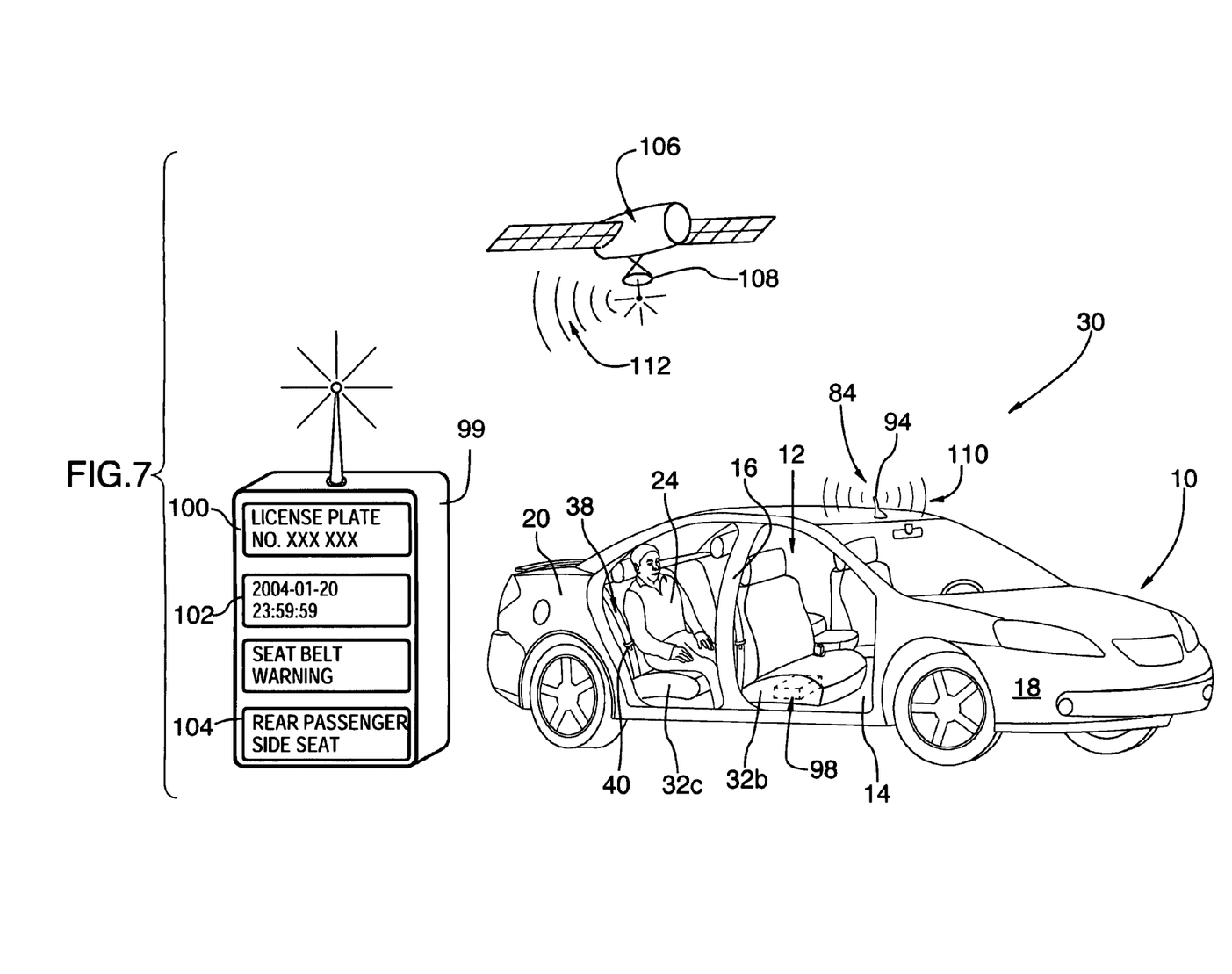
FIG. 7 is a front right perspective view of the vehicle of FIG. 4 shown with doors removed, a retransmission means, and a remote recording device.

The seatbelt assembly is selectively moveable between a fastened configuration (as shown in FIG. 3) and the unfastened configuration (as shown in FIG. 7). In order to reach the fastened configuration, and as may be best appreciated from FIG. 3, the occupant 24 seated in the seat assembly 32 uses the associated seatbelt assembly 38 to grip the tongue plate 50 and pull the seatbelt webbing 40 laterally across his chest to securely engage the tongue plate 50 with the seatbelt fastening member 48 (best seen in FIGS. 1 and 4) in the fastened configuration. It will be appreciated that, with the tongue plate 50 so engaged, the seatbelt fastening member 48 also securely engages the seatbelt webbing 40 in the fastened configuration.

Likewise, it will be appreciated that, when the occupant 24 disengages the tongue plate 50 from the seatbelt fastening member 48, the seatbelt assembly 38 is released from the fastened configuration shown in FIG. 3, and the seatbelt webbing 40 is wound onto the recoil and tensioning device 52 by a reeling force (as indicated by arrow "C" in FIG. 3) exerted on the seatbelt webbing 40 by the device 52. The recoil and tensioning device 52 enables extension and retraction of the seatbelt webbing 40. The tongue plate 50 moves into an unfastened configuration (best seen in FIGS. 4 and 7), whereat the seatbelt fastening member 48 is removed from secure engagement with the seatbelt webbing 40.

Next, it should be appreciated that the occupant sensing means 58 of the seatbelt usage sensing apparatus 30 is preferably also adapted to sense when an at-rest occupying force (as indicated by arrow "A" in FIG. 3) exerted by the seat occupant 24 upon the seat cushion portion 34 of any one of the seat assemblies 32 in the vehicle 10 is in excess of a predetermined threshold value. For example, the threshold value might be predetermined to be equivalent to the at-rest occupying force "A" that would be exerted upon the seat cushion portion 34 by a seat occupant weighing seventy-five pounds (not shown) Alternately, the predetermined threshold value might be set to be equivalent to the at-rest occupying force "A" exerted upon the seat cushion portion 34 by a seat occupant weighing some other amount. The seatbelt usage sensing apparatus 30 is preferably adapted to ascertain, even when the vehicle 10 is in motion, whether each of the seat occupants 24 would exert an at-rest occupying force "A" in excess of the predetermined threshold value.

Figure 1:
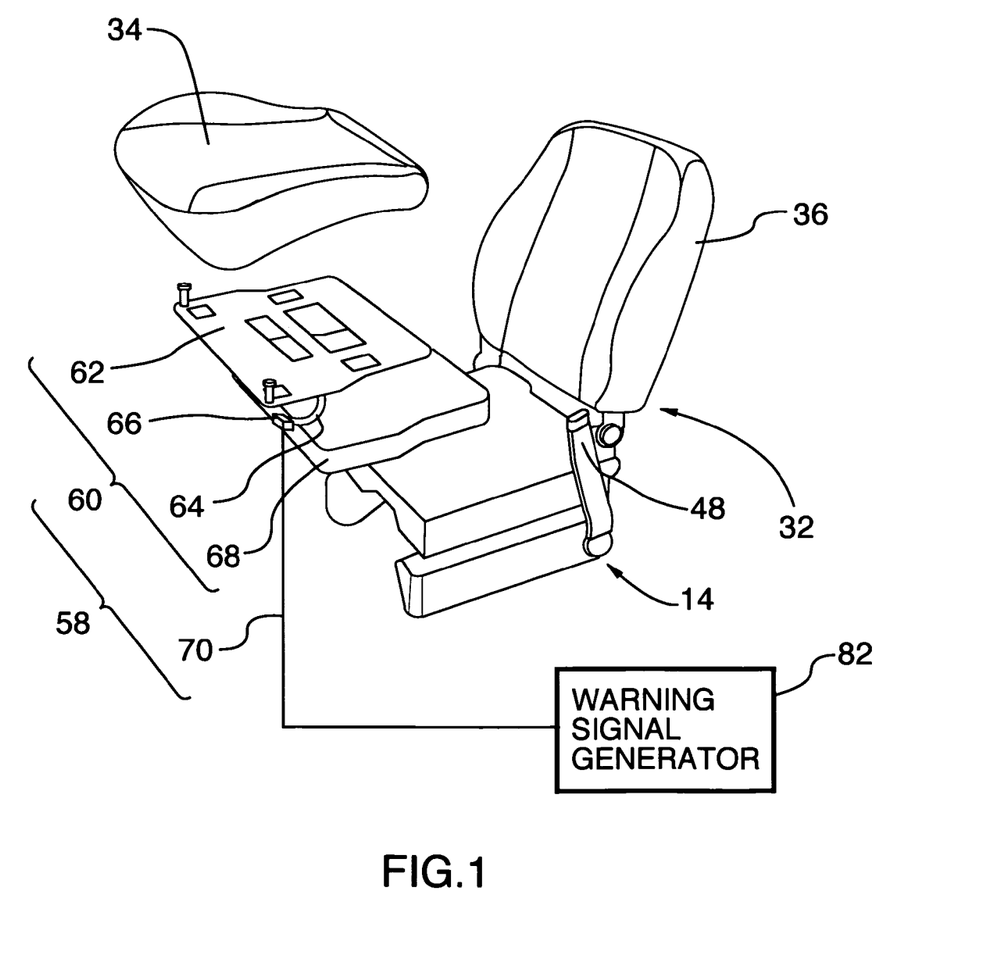
FIG. 1 is an exploded top front left perspective view of a seat assembly into which the present invention may be incorporated.

The occupant sensing means 58 may include a strain gauge apparatus of a generally well-known type (not shown), an electrical mat apparatus (not shown), or a pressure bladder apparatus 60 (best seen in FIG. 1) that is situated under or within the seat cushion portion 34 and adapted to sense and/or ascertain when the occupying force "A" is in excess of the predetermined threshold value. Likewise, any and all technology that may serve as the occupant sensing means 58, including, for example, electronic video and infrared occupant sensing means (not shown) would likewise be suitable and could be utilized according to the seatbelt usage sensing apparatus 30 of the present invention. The pressure bladder apparatus 60 that is shown in FIG. 1 is of a generally well-known type, such as that which is included in the PASSIVE OCCUPANT DETECTION SYSTEM GEN II™ which is manufactured by the Delphi Automotive Systems Corporation of Troy, Mich., and includes a fluid bladder 62 mounted on a backing board 68, with the fluid bladder 62 in fluid communication through a hose 64 with a pressure sensor 66. Naturally, any pressure bladder apparatus 60 other than that shown in FIG. 1 may also be utilized according to the present invention. In FIG. 1, the pressure sensor 66 will be seen to be electrically connected by an occupant sensor circuit 70 to the warning signal generator 82 of the present invention.

The seatbelt sensing means 72 of the seatbelt usage sensing apparatus 30, in addition to determining when the seatbelt assembly 38 is in the unfastened configuration (best seen in FIG. 7), is preferably further adapted to determine when the seatbelt assembly 38 is in the fastened configuration (best seen in FIG. 3). To this effect, and as best seen in FIG. 3, the seatbelt sensing means 72 is provided with a buckle sensor 74 that is electrically connected to the warning signal generator 82. The buckle sensor 74 provides an engagement switch that is mounted substantially adjacent to the seatbelt fastening member 48 and is adapted to sense whether or not the tongue plate 50 of the seatbelt assembly 38 is securely engaged thereby.

The seatbelt sensing means 72 is preferably further adapted to sense when a tensioning force (as indicated by arrow "B" in FIG. 3) exerted by the seat occupant 24 upon the seatbelt webbing 40 is below a predetermined tensioning threshold value, so as to reduce potential circumvention of the seatbelt usage sensing apparatus 30 by those occupants 24 who fasten the seatbelt assembly 38 but do not properly wear same. The predetermined tensioning threshold value may be either constant or variable. Where constant, the tensioning threshold value might be predetermined to be equivalent to the tensioning force "B" that would be exerted upon the seatbelt webbing 40 by a fifth percentile female or a seat occupant 24 of similarly low weight. Where variable, the tensioning threshold value might be predetermined in dependent relation based upon the occupying force "A". That is, the predetermined tensioning threshold value might be higher where the occupying force "A" is gauged to be exerted by a seat occupant 24 weighing one hundred and seventy pounds than where the occupying force "A" is gauged to be exerted by a seat occupant weighing one hundred and ten pounds (not shown). In order to gauge the tensioning force "B" exerted by the seat occupant 24 upon the seatbelt webbing 40, weight and/or force vector measurements might be taken on the seatbelt webbing 40 when the vehicle is at-rest and in various states of acceleration and deceleration.

The seatbelt sensing means 72 of the seatbelt usage sensing apparatus 30 is preferably still further adapted to sense when the seatbelt webbing 40 is extended below a predetermined extension threshold value, so as to further reduce potential circumvention of the seatbelt usage sensing apparatus 30 by those occupants 24 who fasten the seatbelt assembly 38 but do not properly wear same. The predetermined extension threshold value may be either constant or variable. Where constant, the extension threshold value might be predetermined to be equivalent to an extension of the seatbelt webbing 40 that would be required for a fifth percentile female or a seat occupant of similarly small size (not shown) to adequately fasten the seatbelt assembly 38. Where variable, the extension threshold value might also be predetermined in dependent relation based upon the occupying force "A". That is, the predetermined extension threshold value might be higher where the occupying force "A" is gauged to be exerted by a seat occupant 24 weighing one hundred and seventy pounds than where the occupying force "A" is gauged to be exerted by a seat occupant weighing eighty pounds (not shown).

In order to measure the tensioning force "B" and/or the extension of the seatbelt webbing 40, and as best seen in FIG. 3, the seatbelt sensing means 72 is provided with a tension and/or extension sensor 78 that is mounted substantially adjacent to the recoil and tensioning device 52 of the seatbelt assembly 38. The tension and/or extension sensor 78 may be provided with a length limit switch (not shown) to measure the extension of the seatbelt webbing 40. As shown in FIG. 3, the tension and/or extension sensor 78 is electrically connected to the warning signal generator 82.

As best seen in FIG. 3, the warning signal generator 82 is preferably situated outside of the interior seating compartment 12 of the vehicle 10. The warning signal generator 82 preferably includes an electronic signal generator 96 that is adapted to generate and transmit a seatbelt warning signal 110. The electronic signal generator 96 preferably generates the seatbelt warning signal 110 when any one of three conditions is found to exist. Firstly, the seatbelt warning signal 110 might be generated when the seat cushion portion 34 of the seat assembly 32 is in the occupied configuration, with the occupying force "A" in excess of the predetermined threshold value, and with the seatbelt assembly 38 in the unfastened configuration (best seen in FIG. 7). Secondly, the seatbelt warning signal 110 might be generated by the electronic signal generator 96 when the seat cushion portion 34 is in the occupied configuration, the seatbelt assembly 38 is in the fastened configuration, and the tensioning force "B" is below the predetermined tensioning threshold value. Thirdly, the seatbelt warning signal 110 might be generated by the warning signal generator when the seat cushion portion 34 is in the occupied configuration, the seatbelt assembly 38 is in the fastened configuration, and the seatbelt webbing 40 extended below the predetermined extension threshold value.

As may be best appreciated from FIGS. 3 and 5-7, the seatbelt warning signal 110 preferably includes an electromagnetic frequency signal and/or a sound wave signal that is transmitted substantially exterior of the interior seat compartment 12 of the vehicle 10. Likewise, the warning signal generator 82 includes an electromagnetic frequency/sound wave generator 84 that is adapted to emit the electromagnetic frequency signal and/or the sound wave signal.

Figure 5:
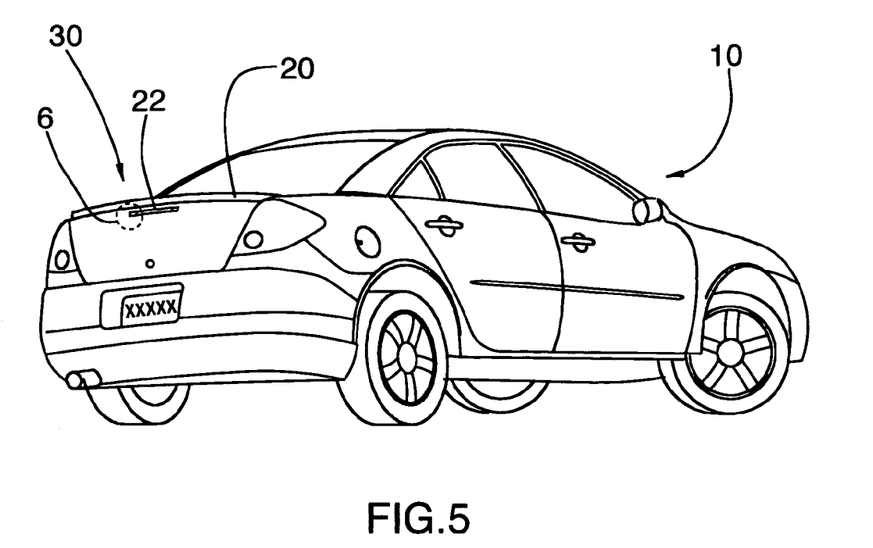
FIG. 5 is a rear right perspective view of an exterior of the vehicle shown in FIG. 4.
Figure 6:
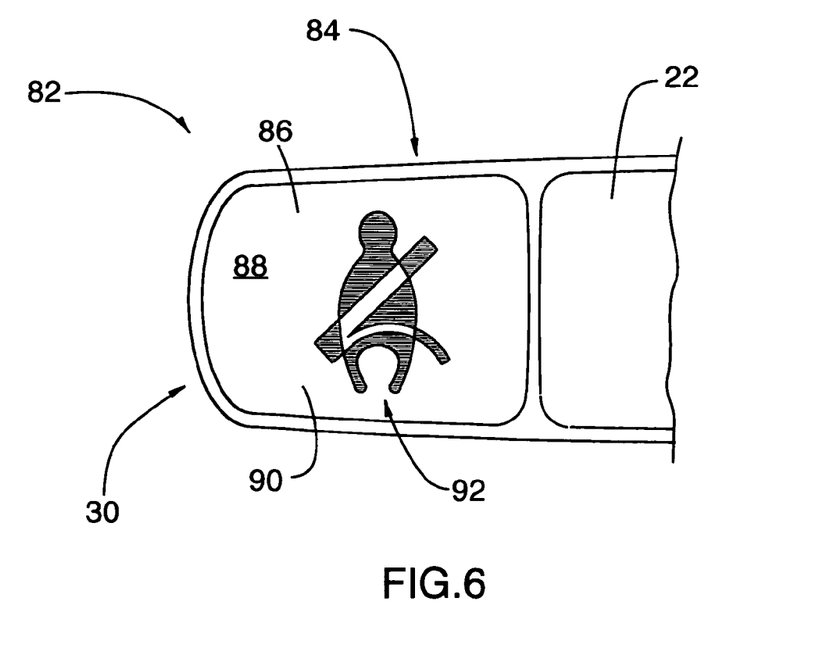
FIG. 6 is a rear elevational view on an enlarged scale of encircled area 6 of FIG. 5.

The electromagnetic frequency signal may be an infrared signal, a visible light signal, and/or an ultraviolet signal. As such, and as best seen in FIGS. 5 and 6, the electromagnetic frequency/sound wave generator 82 includes an illumination device 86 that is preferably securely mounted substantially adjacent to an exterior surface 18 of the vehicle 10, and is adapted to emit the electromagnetic frequency signal. As shown in FIGS. 5 and 6, the illumination device 86 is preferably mounted substantially adjacent to a center high-mounted stop light (CHMSL) device 22 of the vehicle 10. The illumination device 86, however, may be securely mounted anywhere that ensures the electromagnetic frequency signal is visible from substantially exterior of the interior seat compartment 12 of the vehicle 10, such as, for example, mounted in a rearwardly facing orientation substantially adjacent to a CHMSL device 22 that is in juxtaposed relation with a rear window of the vehicle's interior seating compartment 12 (not shown). The illumination device 86 preferably includes an exterior fascia 88 that has a translucent portion 90. As shown in FIG. 6, the translucent portion 90 is preferably adapted to depict a seatbelt warning indicia 92. The translucent portion 90 of the illumination device 86 may cast visible light of any selected color, such as, for example, blue, green or amber colored light.

The electromagnetic frequency signal may be a radio frequency signal, and the sound wave signal may be an infrasound signal, an audible sound signal, and/or an ultrasound signal. As such, and as best seen in FIG. 7, the electromagnetic frequency/sound wave generator 82 preferably includes an antenna/speaker device 94 that is adapted to emit the radio frequency signal and/or the sound wave signal. The antenna/speaker device 94 is preferably securely mounted substantially adjacent to the exterior surface 18 of the vehicle 10. The antenna/speaker device 94, however, may be securely mounted anywhere that ensures the electromagnetic frequency signal is transmitted substantially exterior of the interior seat compartment 12 of the vehicle 10, such as, for example, mounted in the undercarriage or under the hood of the vehicle 10 (not shown).

The warning signal generator 82 preferably further includes a seatbelt usage recording device 98 that is securely mounted substantially exterior relative to the interior seating compartment 12 of the vehicle 10. That is, the seatbelt usage recording device 98 may be mounted anywhere that is not immediately visible to a vehicle occupant situated within the interior seating compartment 12 of the vehicle 10. The seatbelt usage recording device 98 is adapted to receive and record the seatbelt warning signal 110, along with a unique seat identification signal that preferably forms a part thereof and serve to identify the seat assembly 32 responsible for transmission of the seatbelt warning signal 110.

As shown in FIGS. 4 and 7, the seatbelt usage recording device 98 may be mounted under the front passenger seat assembly 32b and/or under the interior floor 14 of the vehicle 10 substantially exterior relative to the interior seating compartment 12. Alternately, the seatbelt usage recording device 98 might be mounted under one of the other seat assemblies, under the center console, behind the dashboard, substantially adjacent to one of the wheel wells, or in any other position not immediately visible to an occupant of the vehicle 10 (not shown).

As seen in FIG. 7, the seatbelt usage recording device 98 preferably further includes a remote recording device 99 that is located remotely relative to the vehicle 10 but is still adapted to receive and record the seatbelt warning signal 110. The remote recording device 99 may receive the seatbelt warning signal 110 directly from the electromagnetic frequency/sound wave generator 82, such as in the case of a roadside police officer monitoring for seatbelt infractions. The seatbelt usage sensing apparatus 30 preferably further includes a retransmission means 106, such as a cellular antenna tower (not shown) or an orbiting satellite (as seen in FIG. 7) having a satellite antenna 108, for receiving the seatbelt warning signal 110 from the electromagnetic frequency/sound wave generator 82, and for subsequently sending a retransmission signal 112 to the remote recording device 99. Further, the seatbelt warning signal 110 preferably includes a unique vehicle identification signal that is adapted to enable remote identification of the vehicle 10 transmitting the seatbelt warning signal 110 (as best seen in FIG. 7).

Preferably, and as best seen in FIG. 7, a time and date recorder 102 of the seatbelt usage recording device 98 is adapted to record time and date signature data for each seatbelt warning signal 110 that is received. Likewise, a seat identification recorder 104 of the seatbelt usage recording device 98 is also adapted to record a unique seat identification datum along with each seatbelt warning signal 110. The remote recording device 99 is preferably further provided with a vehicle identification recorder 100 that is adapted to record a unique vehicle identification datum (such as, for example, the license plate number of the vehicle identification number), so as to allow remote identification of the vehicle 10 responsible for transmission of each seatbelt warning signal 110. The vehicle identification recorder 100, the time and date recorder 102, and the seat identification recorder 104 may each record data to a local computer memory storage unit (not shown) or to a central/remote database (not shown). It will be appreciated that, instead of requiring law enforcement officials to visually check seatbelt shoulder harnesses to ascertain whether each occupant 24 in each passing vehicle 10 is properly buckled in, the permanent recording of such data enables ready retrieval by automobile insurance companies, law enforcement officials and the like in vehicle crash events and otherwise. Additional data might also be recorded by the seatbelt usage recording device 98, including the occupying force "A", the tensioning force "B", and the extension of the seatbelt webbing 40.

It should be appreciated from the foregoing description and from FIGS. 3, 5, and 7 that, regardless of whether the seatbelt warning signal 110 is sent to the seatbelt usage recording device 98 and/or to the electromagnetic frequency/sound wave generator 82, the seatbelt warning signal 110 is transmitted substantially exterior relative to the interior seating compartment 12 of the vehicle 10.

In use, the seatbelt usage sensing apparatus 30 first determines whether any seat assembly 32 within the interior seating compartment 12 of the vehicle 10 is in the occupied configuration with the seat occupant 24 occupying the seat cushion portion 34 thereof (as shown in FIGS. 3 and 7). In the preferred embodiment of the invention, the seat assembly 32 is only determined to be in the occupied configuration when the seatbelt usage sensing apparatus 30 gauges the at-rest occupying force "A" exerted by the seat occupant 24 upon the seat cushion portion 34, and determines the at-rest occupying force "A" to be in excess of the predetermined threshold value.

If the seat assembly 32 is in the occupied configuration, the seatbelt usage sensing apparatus 30 next determines whether the corresponding seatbelt assembly 38 is in the unfastened configuration (as shown in FIG. 7) whereat the seatbelt fastening member 48 securely engages neither the seatbelt webbing 40 nor the tongue plate 50. If the seatbelt assembly 38 is in the unfastened configuration, the seatbelt warning signal 110 is generated.

If the seat assembly 32 is in the occupied configuration, and the seatbelt assembly 38 is in the fastened configuration with the seatbelt fastening member 48 securely engaging the seatbelt webbing 40 (as shown in FIG. 3), the predetermined tensioning threshold value and the predetermined extension threshold value are preferably each then determined in dependent relation based upon the occupying force "A". The seatbelt usage sensing apparatus 30 then determines whether the tensioning force "B" exerted by the seat occupant 24 upon the seatbelt webbing 40 is below the predetermined tensioning threshold value, or whether the seatbelt webbing 40 is extended below the predetermined extension threshold value. In either event, the seatbelt warning signal 110 is generated.

After the seatbelt warning signal 110 is generated, it is transmitted substantially exterior relative to the interior seating compartment 12 of the vehicle 10. The seatbelt warning signal 110 is preferably then received and recorded in the seatbelt usage recording device 98 that is located substantially exterior relative to the interior seating compartment 12 of the vehicle 10. In accordance with the invention, as aforesaid and as seen in FIG. 7, the seatbelt usage recording device 98 preferably also includes a remote recording device 99 that is located remotely relative to the vehicle 10.

Figure 2:
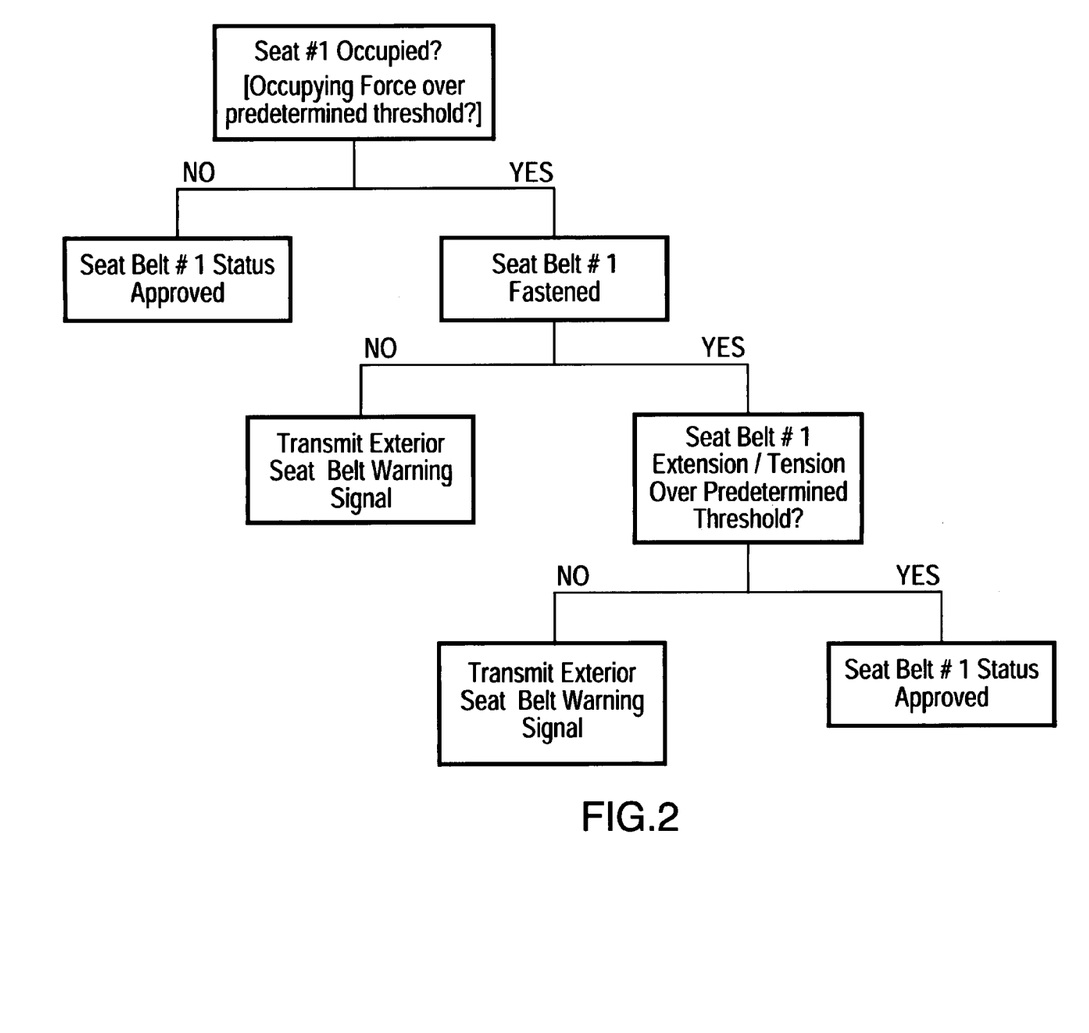
FIG. 2 is a simplified flow chart depicting a method for generating a seatbelt warning signal according to the present invention.

A simplified presentation of this process of generating the seatbelt warning signal 110 is provided in FIG. 2. It is noted that a seatbelt status for each seat assembly 32 will be approved (i) in the event that the seat assembly 32 is not in the occupied configuration, and (ii) in the event that the occupying force "A" is in excess of the predetermined threshold when (a) the tensioning force "B" exerted by the seat occupant 24 upon the seatbelt webbing 40 is equal to or above the predetermined tensioning threshold value, and/or (b) the seatbelt webbing 40 is extended to the predetermined extension threshold value or thereabove. The electronic signal generator 96 may alternately be adapted generate and transmit the seatbelt warning signal 110, as a seatbelt status approved signal, substantially exterior of the interior seating compartment 12 when each or every seat assembly 32 in the vehicle 10 has an approved seatbelt status. That is, in an alternate embodiment of the invention, the failure of any one seat assembly 32 in the vehicle 10 to have an approved seatbelt status can be responsible for preventing the generation and transmission of the seatbelt status approved signal.

In the preferred embodiment of the invention, however, the seatbelt warning signal 110 will not be generated as a seatbelt status approved signal. That is, in the preferred embodiment, the seatbelt warning signal 110 will instead be generated and transmitted by the seatbelt usage sensing apparatus 30 so as to be readily observable and ascertainable substantially exterior of the interior seating compartment 12 of the vehicle 10 when (i) the seat cushion portion 34 is in the occupied configuration (with the seat assembly 32 occupied by a seat occupant 24 having a weight in excess of the predetermined threshold value), and (ii) the seatbelt assembly 38 is either (a) in the unfastened configuration or (b) in an improperly fastened configuration (i.e., when the seatbelt assembly is in the fastened configuration but the tensioning force "B" is below the predetermined tensioning threshold value or the seatbelt webbing 40 is extended below the predetermined extension threshold value). Because the predetermined tensioning and extension threshold values are preferably determined in dependent relation based upon the occupying force "A", the seatbelt usage sensing apparatus 30 is properly said to possess occupant responsive means (i.e., the tension and/or extension sensor 78) to reduce potential circumvention by vehicle occupants 24 in generating and transmitting the seatbelt warning signal 110.

According to the invention, therefore, the exterior transmission of the seatbelt warning signal 110 will help to increase use and wearing of seatbelt assemblies 38 by the occupants 24 of vehicles 10.

It will also be appreciated that the seatbelt usage recording device 98 of the seatbelt usage sensing apparatus 30 according to the present invention enables permanent recording and provides a permanent data log of seatbelt usage by the occupants 24 of the vehicle 10, including seat identification and time and date signature data for each seatbelt warning signal 110. Further, the remote recording device 99 of the seatbelt usage sensing apparatus 30 enables remote recording of seatbelt usage information, including remote identification and recording of the vehicle 10 transmitting each seatbelt warning signal 110.

Other modifications and alterations may be used in the design and manufacture of other embodiments according to the present invention without departing from the spirit and scope of the invention, which is limited only by the accompanying claims. For example, and in addition to generating and transmitting the seatbelt warning signal 110 substantially exterior of the interior seating compartment 12 of the vehicle 10, the warning signal generator 82 may also generate and transmit an interior seatbelt warning signal (not shown) within the interior seating compartment 12. Given the various alternate embodiments of the seatbelt usage sensing apparatus 30 according to the present invention, of which the aforesaid generation of the interior seatbelt warning signal is merely an example, it is perhaps worthwhile to once again note that the invention is limited only by the accompanying claims.

I claim:

1. A seatbelt usage sensing apparatus for use with a vehicle, said seatbelt usage sensing apparatus comprising:
   a) a seat assembly comprising:
      i) a seat cushion portion adapted to be occupied by a seat occupant in an occupied configuration; and
      ii) a seatbelt assembly having a seatbelt webbing and a seatbelt fastening member, said seatbelt assembly being selectively moveable between a fastened configuration and an unfastened configuration; in said fastened configuration, said seatbelt fastening member securely engaging said seatbelt webbing; and in said unfastened configuration, said seatbelt fastening member being removed from said secure engagement with said seatbelt webbing;
   b) an occupant sensing means for determining when said seat cushion portion is in said occupied configuration;
   c) a seatbelt sensing means for determining when said seatbelt assembly is in said unfastened configuration; and
   d) a warning signal generator adapted to generate and transmit a seatbelt warning signal when said seat cushion portion is in said occupied configuration and said seatbelt assembly is in said unfastened configuration, with said seatbelt warning signal being transmitted substantially exterior relative to an interior seating compartment of the vehicle.

2. A seatbelt usage sensing apparatus according to claim 1, wherein said seatbelt warning signal comprises an electromagnetic frequency signal, and wherein said warning signal generator comprises an electromagnetic frequency generator adapted to emit said electromagnetic frequency signal.

3. A seatbelt usage sensing apparatus according to claim 2, wherein said electromagnetic frequency generator is securely mounted substantially adjacent to an exterior surface of the vehicle; and wherein said electromagnetic frequency signal is selected from the group consisting of infrared signals, visible light signals, and ultraviolet signals.

4. A seatbelt usage sensing apparatus according to claim 3, wherein said electromagnetic frequency signal is a visible light signal, and wherein said electromagnetic frequency generator comprises an illumination device adapted to emit said visible light signal.

5. A seatbelt usage sensing apparatus according to claim 4, wherein said illumination device comprises an exterior fascia having a translucent portion, with said translucent portion depicting a seatbelt warning indicia.

6. A seatbelt usage sensing apparatus according to claim 4, wherein said illumination device is mounted substantially adjacent to a high-mounted stop light device of the vehicle.

7. A seatbelt usage sensing apparatus according to claim 2, wherein said electromagnetic frequency signal comprises a radio frequency signal; and wherein said electromagnetic frequency generator comprises an antenna device adapted to emit said radio frequency signal.

8. A seatbelt usage sensing apparatus according to claim 7, wherein said antenna device is securely mounted substantially adjacent to an exterior surface of the vehicle.

9. A seatbelt usage sensing apparatus according to claim 1, wherein said seatbelt warning signal comprises a sound wave signal; wherein said sound wave signal is selected from the group consisting of infrasound signals, audible sound signals, and ultrasound signals; and wherein said warning signal generator comprises a speaker device adapted to emit said sound wave signal.

10. A seatbelt usage sensing apparatus according to claim 1, wherein said seatbelt warning signal comprises a unique vehicle identification signal, with said unique vehicle identification signal being adapted to enable remote identification of the vehicle transmitting said seatbelt warning signal.

11. A seatbelt usage sensing apparatus according to claim 1, wherein said seatbelt warning signal comprises a unique seat identification signal, with said unique seat identification signal being adapted to enable external identification of said seat assembly transmitting said seatbelt warning signal.

12. A seatbelt usage sensing apparatus according to claim 1, wherein said occupant sensing means is adapted to sense when an at-rest occupying force exerted by said seat occupant upon said seat cushion portion is in excess of a predetermined threshold value; and wherein said warning signal generator is more particularly adapted to generate said seatbelt warning signal only when said occupying force is in excess of said predetermined threshold value.

13. A seatbelt usage sensing apparatus according to claim 12, wherein said occupant sensing means comprises a pressure bladder apparatus adapted to sense when said occupying force is in excess of said predetermined threshold value.

14. A seatbelt usage sensing apparatus according to claim 1, wherein said seatbelt sensing means is further adapted to determine when said seatbelt assembly is in said fastened configuration and to sense when a tensioning force exerted by said seat occupant upon said seatbelt webbing is below a predetermined tensioning threshold value; and wherein said warning signal generator is further adapted to generate said seatbelt warning signal when said seat cushion portion is in said occupied configuration, said seatbelt assembly is in said fastened configuration, and said tensioning force is below said predetermined tensioning threshold value.

15. A seatbelt usage sensing apparatus according to claim 14, wherein said occupant sensing means is adapted to gauge an at-rest occupying force exerted by said seat occupant upon said seat cushion portion; and wherein said predetermined tensioning threshold value is predetermined in dependent relation based upon said occupying force.

16. A seatbelt usage sensing apparatus according to claim 1, wherein said seatbelt assembly further comprises a tensioning means for extending and retracting said seatbelt webbing; wherein said seatbelt sensing means is further adapted to determine when said seatbelt assembly is in said fastened configuration and to sense when said seatbelt webbing is extended below a predetermined extension threshold value; and wherein said warning signal generator is further adapted to generate said seatbelt warning signal when said seat cushion portion is in said occupied configuration, said seatbelt assembly is in said fastened configuration, and said seatbelt webbing is extended below said predetermined extension threshold value.

17. A seatbelt usage sensing apparatus according to claim 16, wherein said occupant sensing means is adapted to gauge an at-rest occupying force exerted by said seat occupant upon said seat cushion portion; and wherein said predetermined extension threshold value is predetermined in dependent relation based upon said occupying force.

18. A seatbelt usage sensing apparatus according to claim 1, wherein said warning signal generator comprises:
   a) an electronic signal generator adapted to generate and transmit said seatbelt warning signal; and
   b) a seatbelt usage recording device that is securely mounted substantially exterior relative to the interior seating compartment of the vehicle, said seatbelt usage recording device being adapted to receive and record said seatbelt warning signal.

19. A seatbelt usage sensing apparatus according to claim 18, wherein said seatbelt usage recording device is further adapted to record time and date signature data for each said seatbelt warning signal.

20. A seatbelt usage sensing apparatus according to claim 18, wherein said seatbelt usage recording device is further adapted to record a unique seat identification datum for each said seatbelt warning signal, with each said unique seat identification datum being adapted to identify said seat assembly transmitting said seatbelt warning signal.

21. A seatbelt usage sensing apparatus for use with a vehicle, said seatbelt usage sensing apparatus comprising:
   a) a seat assembly comprising:
      i) a seat cushion portion having an unoccupied configuration and adapted to be occupied by a seat occupant in an occupied configuration; and
      ii) a seatbelt assembly having a seatbelt webbing and a seatbelt fastening member, said seatbelt assembly being selectively moveable between a fastened configuration and an unfastened configuration; in said fastened configuration, said seatbelt fastening member securely engaging said seatbelt webbing; and in said unfastened configuration, said seatbelt fastening member being removed from said secure engagement with said seatbelt webbing;
   b) an occupant sensing means for determining when said seat cushion portion is in said occupied configuration;
   c) a seatbelt sensing means for determining when said seatbelt assembly is in said fastened configuration; and
   d) a warning signal generator adapted to generate and transmit a seatbelt warning signal when said seat cushion portion is in said unoccupied configuration, and further adapted to generate and transmit said seatbelt warning signal when said seat cushion portion is in said occupied configuration and said seatbelt assembly is in said fastened configuration, with said seatbelt warning signal being transmitted substantially exterior relative to an interior seating compartment of the vehicle.

22. A method for generating and transmitting a seatbelt warning signal from a seat assembly and a corresponding seatbelt assembly of a vehicle, said method comprising the steps of:
   a) determining when the seat assembly is in an occupied configuration whereat a seat occupant occupies a seat cushion portion of the seat assembly in an interior compartment of the vehicle;
   b) determining when the seatbelt assembly is in an unfastened configuration whereat a seatbelt fastening member of the seatbelt assembly is removed from secure engagement with a seatbelt webbing of the seatbelt assembly;
   c) generating said seatbelt warning signal when the seat assembly is in said occupied configuration and said seatbelt assembly is in said unfastened configuration;
   d) transmitting said seatbelt warning signal substantially exterior relative to said interior seating compartment; and
   e) receiving and substantially permanently recording said seatbelt warning signal via a seatbelt usage recording device that is substantially exterior relative to said interior seating compartment.

23. A method according to claim 22, wherein in step (a) the seat assembly is only determined to be in said occupied configuration when an at-rest occupying force exerted by said seat occupant upon said seat cushion portion is in excess of a predetermined threshold value.

24. A method according to claim 22, further comprising the additional steps of:
   b.1) determining when the seatbelt assembly is in a fastened configuration whereat said seatbelt fastening member securely engages said seatbelt webbing;
   b.2) determining when a tensioning force exerted by said seat occupant upon said seatbelt webbing is below a predetermined tensioning threshold value; and
   c.1) generating said seatbelt warning signal when the seat assembly is in said occupied configuration, the seatbelt assembly is in said fastened configuration, and said tensioning force is below said predetermined tensioning threshold value.

25. A method according to claim 24, further comprising the additional steps of:
   a.1) gauging an at-rest occupying force exerted by said seat occupant upon said seat cushion portion; and
   b.1.1) predetermining said predetermined tensioning threshold value in dependent relation based upon said occupying force.

26. A method according to claim 22, further comprising the additional steps of:
   b.1) determining when the seatbelt assembly is in a fastened configuration whereat said seatbelt fastening member securely engages said seatbelt webbing;
   b.2) determining when said seatbelt webbing is extended below a predetermined extension threshold value; and
   c.1) generating said seatbelt warning signal when the seat assembly is in said occupied configuration, the seatbelt assembly is in said fastened configuration, and said seatbelt webbing is extended below said predetermined extension threshold value.

27. A method according to claim 26, further comprising the additional steps of:
   a.1) gauging an at-rest occupying force exerted by said seat occupant upon said seat cushion portion; and
   b.1.1) predetermining said predetermined extension threshold value in dependent relation based upon said occupying force.

28. A method according to claim 22, wherein in step (d) said seatbelt warning signal is a visible light signal emitted by an illumination device that is securely mounted substantially adjacent to an exterior surface of the vehicle.

29. A method according to claim 22, wherein in step (e) said seatbelt usage recording device additionally records time and date signature data for each said seatbelt warning signal.

30. A method according to claim 22, wherein in step (e) said seatbelt usage recording device additionally records a unique seat identification datum for each said seatbelt warning signal, with each said unique seat identification datum being adapted to identify said seat assembly transmitting said seatbelt warning signal.

31. A method according to claim 22, wherein in step (d) said seatbelt warning signal is a radio frequency signal emitted by an antenna device that is securely mounted substantially exterior relative to said interior seating compartment.

32. A method according to claim 31, wherein in step (e) said seatbelt usage recording device is located remotely relative to the vehicle.

33. A method according to claim 32, wherein in step (e) said seatbelt usage recording device additionally records a unique vehicle identification signal, with said unique vehicle identification signal being adapted to enable remote identification of the vehicle transmitting said seatbelt warning signal.

* * * * *